Oct. 18, 1966        M. N. BOUKAIR        3,279,548
AUTOMATIC WEIGHING APPARATUS FOR FOOD SLICING MACHINE
Filed Nov. 19, 1964
3 Sheets-Sheet 1

INVENTOR.
MOE N. BOUKAIR
BY
*Tay & Tay*
ATTORNEYS

Oct. 18, 1966　　　M. N. BOUKAIR　　　3,279,548
AUTOMATIC WEIGHING APPARATUS FOR FOOD SLICING MACHINE
Filed Nov. 19, 1964　　　　　　　　　　　　　　　3 Sheets-Sheet 2

INVENTOR.
MOE N. BOUKAIR
BY
*Fay & Fay*
ATTORNEYS

Oct. 18, 1966   M. N. BOUKAIR   3,279,548
AUTOMATIC WEIGHING APPARATUS FOR FOOD SLICING MACHINE
Filed Nov. 19, 1964
3 Sheets-Sheet 3

INVENTOR.
MOE N. BOUKAIR
BY
ATTORNEYS

United States Patent Office 3,279,548
Patented Oct. 18, 1966

3,279,548
AUTOMATIC WEIGHING APPARATUS FOR
FOOD SLICING MACHINE
Moe N. Boukair, 20650 Fairmont Blvd.,
Shaker Heights, Ohio
Filed Nov. 19, 1964, Ser. No. 412,398
6 Claims. (Cl. 177—60)

This invention relates to a weighing apparatus and more particularly to an automatic weighing apparatus for use with food parcelling machines.

The food handling and processing industry has for its entire history, continuing to the present, been plagued with the inability of the operators of slicing machines or, for example grinding machines, to be able to repetitively dispense similar quantities of foodstuff. In particular, it is important that a customer buying a sandwich at a restaurant or delicatessen be assured that the quantity of meat, cheese, or any other desired foodstuff be the same at all times. This, of course, has not been possible because of the fact that the quantity of the cut depends upon the adeptness of the operator on handling the machine, the judgment of the operator, and various other factors. The result has been that the quantity of foodstuff may vary from about one-half to two or three times the desired quantity. This, of course, is not only undesirable from the customer standpoint, but is also costly and nondesirable from the restaurant or delicatessen owner's point of view.

Furthermore, with the present manual type of slicing machines it is necessary that an operator be constantly overseeing the operation in order to insure that the desired number of slices, and thereby the desired weight, is achieved. This obviously ties one employee to the machine and he must be ever-present while the slicer or grinder is in operation to insure that the machine is shut off after the desired quantity is achieved.

It is an object of this invention to insure that the quantity of foodstuff be constant over any period of time, and also be independent of the operator operating the slicer or grinding machine.

It is a further object of this invention to provide for automatic operation of the slicer or grinding machine by providing an automatic weighing circuit for use therewith which is responsive to the attainment of the desired quantity to automatically shut off the machine.

It is still another object of this invention to provide a control apparatus which may be used in conjunction with standard slicing, grinder or other types of food processing type of machines with no interference to the normal operation of the machinery.

It is another object of this invention to provide an automatic weighing apparatus which may be used in conjunction with standard food slicing and grinding machines without interfering with the normal operation of the weighing apparatus or with the slicing or grinding machinery with which it is to be used.

It is still another object of this invention to provide a weighing apparatus which may be utilized with any type of food processing or foodstuff operation such that accurate amounts of desired foodstuff may be obtained without extensive changes being necessary in the foodstuff apparatus or in the weighing scale to be used in conjunction therewith.

It is still another object of this invention to provide a weighing scale which is settable to automatically provide for a wide variation of desired food quantities which range from the smallest increment desired upwards.

It is another object of this invention to provide automatic weighing apparatus which can be readily adjusted to work in conjunction with and control the operation of commercially available food machinery.

Another object of the invention is to provide weighing apparatus for control of slicers, grinders, etc., which is extremely accurate in its operation and economical in design.

It is still another object of this invention to provide an automatic control circuit for use with commercially available food processing machines to set the same into operation and automatically turn them off after attainment of the desired quantity.

Additional objects and feaures of the invention will appear from the following description in which the preferred embodiments have been set forth in detail in conjunction with the accompanying drawings.

Referring to the drawings.

In general, the invention relates ot an automatic weighing scale which includes the primary weight responsive arm of the scale. The primary weight responsive arm of the scale is responsive to differential settings to indicate the desired amount of quantity, and reassures a neutral position upon the platform thereof receiving that desired amount. Fixedly mounted for movement with the primary weight responsive arm of the scale is a switching means which assumes a path of travel proximate a switch for activation thereof. The switch is in circuit with the source of operating potential for the cooperating food slicing machine, and, accordingly, upon the weight responsive arm assuming a differential settable off-neutral position indicative of the desired amount of quantity, the food processing machinery switch will activate the machine to initiate operation thereof. Upon the desired amount of foodstuff being received by the platform of the scale the primary weight responsive arm reassures a neutral position to deactivate the switch means and thereby disable further operation of the processing machine.

Figure 1:
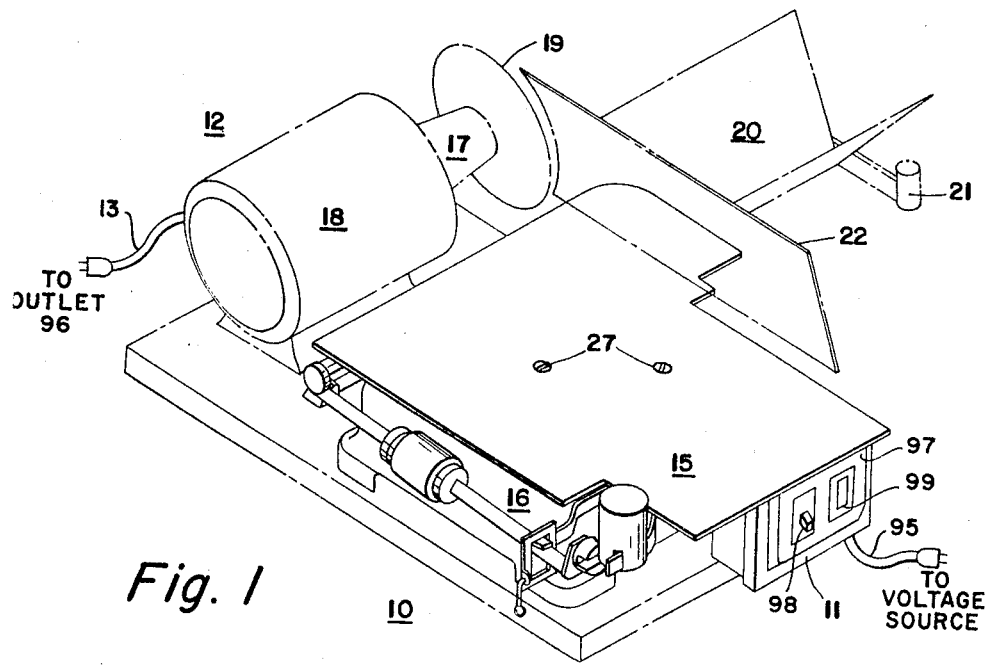
FIG. 1 is an isometric view showing the automatic weighing scale used to control the operation of a meat slicing machine.

We turn now to FIG. 1, whereat is shown my unique automatic weighing apparatus, cooperating with and governing the operation of, an automatic slicing machine. It should be emphasized that FIG. 1 is only one illustration of the machine that my automatic weighing apparatus is capable of cooperating with, and, accordingly, the illustration is not intended to in any way diminish the scope of my invention. As shown in FIG. 1, numeral 10 illustrates my automatic scale which is to be used to control the operation of, in this case, slicer 12. Numeral 11 designates the main power switch and control box which permits actuation of motor 18 in accordance with the condition of scale 10. Coupled to the shaft of motor 18, for movement therewith, is circular blade 19. Circular blade 19 being rotatively mounted to shaft 17 of motor 18 for rotative movement in the plane defined thereby. Cooperating with slicer 12, and being an essential part thereof, is a food product carrier 20. Handle 21 is operatively connected to carrier 20 to provide longitudinal movement of the food product relative to the cutting edge of circular blade 19. As an alternative, applicant contemplates that a gravity biased plunger, not shown, may be used to automatically urge the food product toward the front end of the carrier. In addition, a slice calibrating member 22 is provided. Member 22 terminates in an arcuate end portion congruent with the active slicing portion of circular blade 19. Furthermore, member 22 in addition to acting as a slice thickness selecting means is capable of preventing injury to the operator by acting as a guard.

More particularly, member 22 is differentially positionable, by a mechanism, not shown, from a position in the plane as defined by the blade 19 to assume a number of other positions parallel thereto. It can accordingly be appreciated that once the thickness of the slice is determined and the unnecessary setting made that the foodstuff or food product will be urged in abutting relationship therewith, because of the biasing force provided by the suitable gravity fed plunger. In addition, carriage 20 may be made to reciprocate along a fixed predetermined longitudinal path relative to circular blade 19. Therefore, upon activation, slicer 12 is capable of repetitive diminution of the foodstuff until the operation, is terminated, or total parcelling thereof is accomplished. It is obvious that the sliced product is accumulated on a suitable commodity platter 15. The commodity platter being positioned subadjacent to slicer blade 19.

It is clear from the above description that under either manual or automatic operation the slicing arrangement discussed hereinabove lacks a sense of direction since both the number of slices and the desired quantity by weight are governed by, and accordingly subject to, the human frailties of the operator. Furthermore, it is also clear, that close supervision is necessary with an automatic slicer in order to prevent waste due to over-cutting. Inherent in the close supervision required in an automatic slicer is the inability of the machine operator to concurrently perform other functions. It is, accordingly, clear that my invention is immediately useful in that it not only permits the parcelling out of only the desired number of slices, but it also permits the operator to concurrently perform other tasks, with the assurance that the slicing operation will be automatically terminated upon attainment of the desired amount of product.

Figure 3:
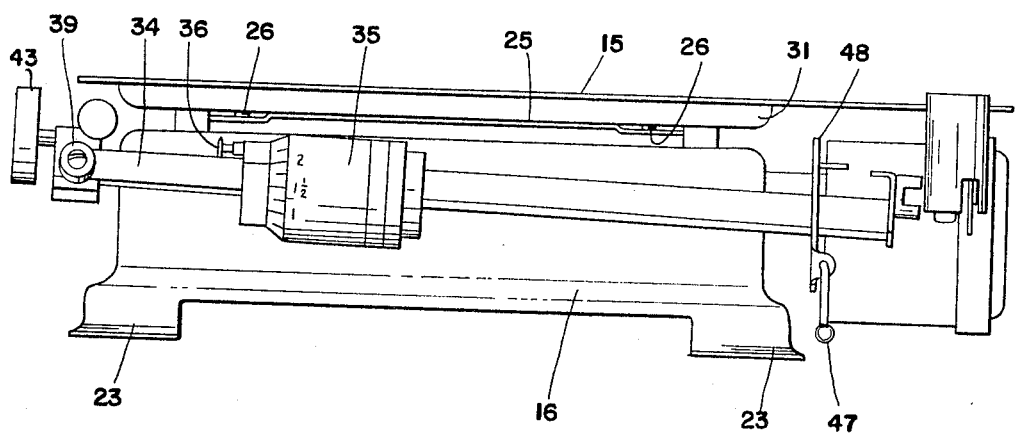
FIG. 3 is a front elevational view of the automatic weighing scale.
Figure 2:
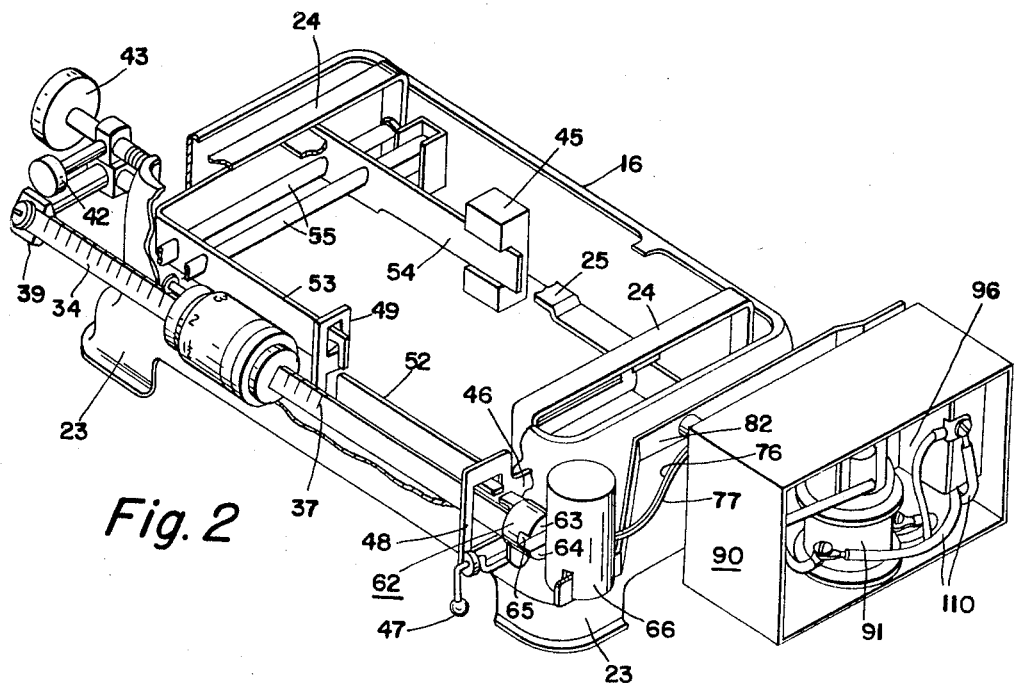
FIG. 2 is an isometric view of the automatic weighing scale with the platform removed and other parts broken away.
Figure 4:
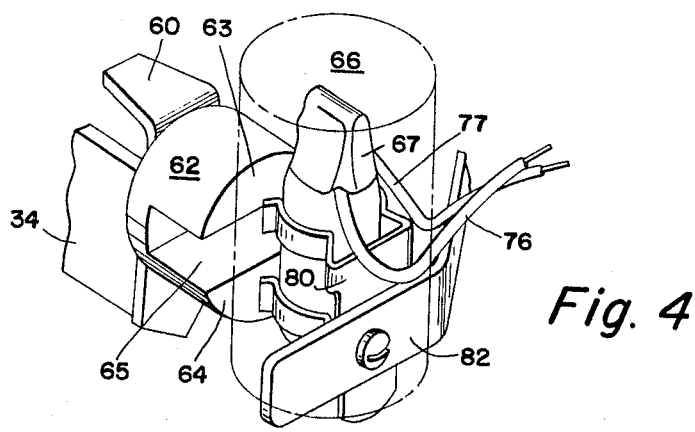
FIG. 4 is an enlarged mechanical view, with portions broken away, of the sensing device which may be employed with the present invention.

Turning now to FIGS. 2 and 3 I shall now describe my unique automatic weighing apparatus in detail. The scale consists of an ingeniously modified commercially available scale having a rugged cast iron base 16. Base 16 is provided with feet 23. Fixedly connected to the frame are brackets 24. A cross member 25, which is provided with off-set terminating ends is fixedly connected between brackets 24. The off-set terminating ends in addition to being fixed to brackets 24 provide threaded apertures for receipt of screws 26. Screws 26 threadingly secure platform 31 to the cross member 25. Furthermore, suitable apertures are provided in platform 31 to accommodate screws 27 for removably securing commodity platter 15 thereto.

The weighing mechanism of scale 10 is similar to other commercially available scales, in that a capacity beam or arm 34 is pivotably connected to the scale counter-balancing assembly by way of a suitable connector 39. Capacity arm 34 is appropriately graduated to facilitate easy selection of the desired quantities. In addition, longitudinally movable along capacity arm 34 is vernier weight poise 35. Vernier weight poise 35 is not only movable parallel to the longitudinal axis of the weigh beam to the graduation position desired on the capacity arm, but also is rotatable about capacity arm 35 to permit selection of quantities between those represented by next adjacent graduations. Therefore, if the quantity desired is between two successive graduations, 37 for example, the index point of vernier poise 35 would be set to the graduation immediately below that desired and the vernier adjusted to make up the difference. As shown in FIGS. 2 and 3, a vernier locking mechanism 36 is provided to prevent undesired movement of the desired vernier setting of vernier weight poise 35 due to bumping or jarring of the scale or operation of the slicing machine for example.

The capacity arm 34 is connected by way of suitable connecting means 39 and 42 to the counter-balancing system of the scale. It should be appreciated that upon selective longitudinal positioning of vernier weight poise 35 to the desired graduated position, the counter-balancing system will be disturbed from its balanced neutral position, and the system will remain in this unbalanced state until a rebalancing is obtained by receipt of the desired amount of food product upon platter 15.

The counter-balancing system employed on the scale includes levers 52 and 53 and fulcrum means 49. This counter-balancing system provides the vehicle by which a rebalance due to platter 15 receipt of foodstuff is achieved, after a selection is made by the setting of vernier weight poise 35.

In addition, it should be appreciated that my scale is provided with an appropriate zero adjustment mechanism 43 which enables the scale to be accurately brought to a zero load balance. More particularly, by rotating knurled screw head 43 in either a clockwise or counter-clockwise manner, a condition of balance under empty load receiving platter conditions, such that the weight indication is zero will be achieved. A suitable zero adjustment mechanism locking screw 42 is also provided to prevent the disturbance of the zero setting due to jarring or bumping.

Furthermore, as has already been discussed, I have provided scale 10 with an appropriate platter 15 that has been suitably shaped to provide a contiguous fit with slicer 12. It should be understood that platter 15 must be shaped and fitted to enable it to assume a subadjacent relationship with circular blade 19, and, accordingly, assure receipt of the parcelled foodstuff. The addition of platter 15 upon platform 31, of course, will unbalance the counter-balancing system of the scale and, accordingly, a reestablishment of zero balance with an empty platter 15 is imperative. The limited zero adjustment provided by mechanism 43 is unable to rebalance the system with the addition of platter 15, and it was therefore necessary to modify the system tare to absorb the weight of platter 15.

The scale tare system includes a tare beam 54 which is operatively connected to the counter-balancing lever system by way of connecting rods 55. Fixedly mounted at the appropriate point of tare beam 54 is tare weight 45. Tare weight 45 is selectively chosen such that with a middle setting of zero adjustment mechanism 43 the scale counter-balancing system is in a balanced or equilibrium condition, and capacity beam 34 is visibly indicative of the scale's balanced condition.

Turning once again to capacity beam 34, it should be noted that a scale balance is obtained when the end of beam 34, which extends through trig loop 48 is in a median position. Trig loop 48 is fixedly attached to frame 16 by way of bracket 46. Mounted for rotation proximate the bottom of trig loop 48 is trig 47. As shown in FIGS. 1 through 3, the trig is in an unlocked position, and is capable of being latched in an opposite position to lock or prevent the weighing action of the scale. In actual operation trig 47 locks capacity beam 34 to prevent actuation thereof. In addition to providing a means of determining when scale equilibrium has been obtained, by observing when the portion of the capacity beam which projects into and through the trig loop, bisects the space circumscribed by the trig loop, the trig loop is also designed and constructed to restrain the vertical angular motion of the weight beam to pre-established limits.

Fixedly mounted to the terminal end of capacity beam 34, which projects through trig loop 48, is a bifurcated permanent magnet 62, having pole pieces 63 and 64.

The opposed positions of poles 63 and 64 define a non-magnetic air slot 65 which is devoid of magnetic properties. Magnet 62 accordingly traverses the same vertical angular path as capacity beam 34. Fixedly mounted proximate the path of magnet 62, in magnetic communication therewith, is mercury switch 67. A suitably slotted protective cover 66 is shown to enclose switch 67. Mercury switch 67 is selectively mounted at the appropriate elevation, relative to capacity beam 34 and trig loop 48, by bracket 82. Bracket 82 is fixedly mounted, at a point proximate its end, to frame 16 of scale 10. In addition to supporting mercury switch 67 at one end thereof, bracket 82 also provides the means of mounting electrical interlocking means 11 to scale 10.

Mercury switch 67 is fixedly held at the appropriate level by bifurcated clip 80, clip 80 in turn being removably mounted to bracket 82. In addition, clip 80 is provided with a projection proximate its lowermost extremity to prevent mercury switch 67 from slipping from its desired elevational position. It is, of course, obvious that the bottom switch support projection is strategically located to insure that the active elements of switch 67 will be at the proper position for magnetic communication with magnet 62.

Figure 5:
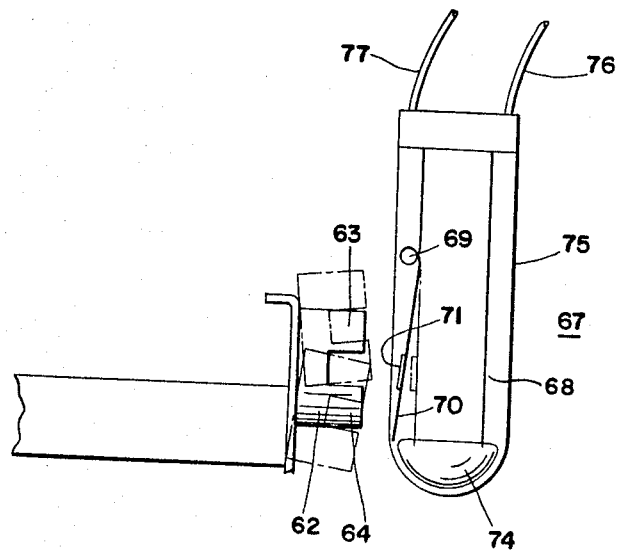
FIG. 5 is a diagrammatic representation of the active elements which make up the sensing device and the various positions the elements will assume under magnetic operation.

FIG. 5 illustrates the active elements of mercury switch 67 in more detail than possible in any of the other figures where switch 67 is schematically shown. Mercury switch 67 includes a glass envelope 75 which encloses the operative and essential switch elements. A small mercury pool 74 is provided at the bottom of envelope 75. Contact 68 of switch 67 is fixedly positioned in the envelope so that one of its extreme ends terminates in mercury pool 74. A second contact 70 is also provided and one end thereof is fixedly mounted in envelope 75. The other end of lead 70 is biased by spring 69 to be normally in a non-mercury contacting position. Accordingly, under normal conditions with only contact 68 in a mercury contacting position, switch 67 will be in an open condition. In order to selectively place switch 67 in its closed condition a magnet armature 71 is fixedly mounted to lead 70. Magnet armature 71 is responsive to and subjected to the magnetic repulsive action of magnet 62 to assume a position such that its free moving end will contact the mercury pool 74. It is obvious that when lead 68 and 70 are both positioned in mercury pool 74 that the circuit of which switch 67 is a part will be in a closed, or completed state. Leads 76 and 77, operatively connected to contacts 68 and 70 respectively, provide the means by which mercury switch 67 is placed in circuit with electrical interlock 11 and slicer 12.

As was previously detailed hereinabove, switch 67 is held in operative position by clip 80. In order to permit proper magnetic communication between magnet 62 and magnet armature 71, it is necessary that switch 67 be mounted in clip 80 in an armature 71 exposed position. Furthermore, switch 67 is mounted at the appropriate elevational position, to bracket 82, such that with the scale in an equilibrium state, and capacity arm 34 bisecting the area defined by trig loop 48, armature 71 will be opposite to the non-magnetic slot between poles 63 and 64 of magnet 62. In this manner, with vernier weight poise 35 in a zero position on capacity arm 34, and the scale platter 15 being empty, the non-magnetic slot 65 is positioned opposite to magnet armature 71 to prevent actuation of magnetic switch 67.

However, upon the operator moving vernier weight poise 35 to the desired quantity position of capacity arm 34, the equilibrium of the scale will be disturbed to result in a downwardly directed vertical angular path being traversed by magnet 62. This downward movement of magnet 62 results in pole 63 providing a repulsive magnetic force to magnet armature 71 and thus move contact 70, against the biasing of spring 69, into mercury pool 74. The movement of contact 70 into mercury pool 74 results in switch 67 being closed in a manner as hereinabove discussed. Upon a scale balance being obtained by platter receipt of the desired quantity magnet 62 resumes its initial equilibrium position with non-magnetic air slot 65 opposite armature 71 to permit reopening of switch 67.

Figure 6:
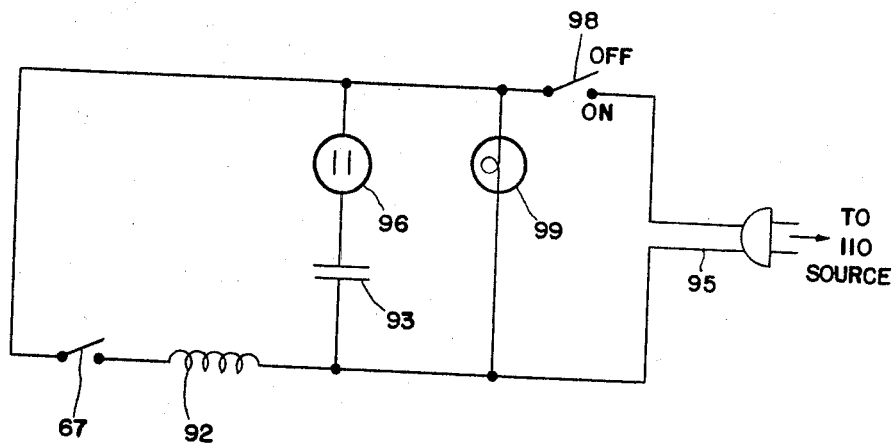
FIG. 6 is an electrical schematic diagram of the system and the manner in which the operation of food processing equipment is controlled by the scale.

Turning now to FIGS. 2 and 6 to discuss in greater detail the electrical interlocking means provided for coupling my unique scale to slicer 12, we see that a housing 90 of stainless steel or any other desired material is provided. Housing 90 is provided with an operatively hinged cover 97. Cover 97 has a system "on-off" switch 98, and a system "on" indicating light 99 mounted thereupon. A mercury relay 91 is mounted within housing 90 and electrical outlet 96 is fixedly mounted to an end thereof. As indicated in FIG. 1, a cord and plug arrangement 95 is used to connect my system to a suitable source of electrical potential. In circuit with the suitable source of potential is system "on-off" switch 98, see FIG. 6. As further shown in FIG. 6, system "on" light 99 places switch 98 in electrical energization circuit with the source of potential, irrespective of the other conditions of the system. Accordingly, upon connecting plug 95 to a suitable 110 volt source of potential the selectively positionable switch 98 is placed in its closed or "on" state, and system "on" light 99 will indicate the proper operating conditions to the operator, so that he can proceed with operation of the system.

Mercury relay 91 is of standard commercially available design and includes an operating coil 92, and normally open relay contacts 93. Upon energization of coil 92 a contact 93 closing pool of mercury, not shown, is supplied thereto.

Turning again to the electrical wiring diagram of FIG. 6, we see that in addition to system "on-off" switch 98 and system indicating "on" light 99 being in circuit with the suitable source of activating potential, by way of plug 95, we also have operating coil 92 of relay 91 and mercury switch 67 operatively connected in series circuit therewith. In addition, the series circuit including relay contacts 93 of mercury relay 92 and outlet 96 are connected across the suitable source of potential. Further, as can be understood from FIGS. 1 and 2, outlet 96 provides the source of operating potential for motor 18 of slicer 12. In this fashion, energization of mercury relay 91, which depends upon closure of mercury switch 67, permits the closing of its associated normally open contacts 93 to thereby provide operating potential to motor 18, by way of electrical outlet 96. This condition persist for as long as mercury switch 67 remains closed, and upon opening thereof, mercury relay operating coil 92 deenergizes to open its normally opened relay contacts 93 and prevent further actuating power to motor 18 of slicer 12.

*Mode of operation*

A platform 15 is formed to provide contiguous fitting relationship with the machine it is to control. The platter is then removably secured to scale platform 31 by screws 27. The unit is then positioned so that platter 15 is subadjacent to, in our example, circular blade 19. Also the selected foodstuff is positioned in carrier 20 and a gravity fed plunger is utilized to urge the foodstuff into its forwardmost position therein.

Plug and cord 13 of motor 18 is next inserted into outlet 96 of electrical interlock 11. Also, electrical cord 95 is connected to a source of suitable potential and system "on-off" switch 98 is turned to its "on" position. System "on" indicating light 99 is responsive to activation of switch 98 and assumes an ignited state to indicate a system "go" condition. Trig lock 47 is then placed in its unlocked position to enable capacity arm 34 to assume a balanced equilibrium condition, with mercury switch 67 opened and mercury relay 91 in an "off," or deenergized, condition. Vernier weight poise 35 is then differentially positioned to the quantity of foodstuff desired by the operator. Capacity arm 34 is responsive to the setting of weight poise 35 to assume a downwardly directed vertically angular movement. Movement of magnet 62, which is fixedly connected to capacity arm 34, relative to mercury switch 67, results in a repulsive force being provided thereby to magnetic armature 71, and accordingly closes switch 67. Turning now to FIG. 6, we see that closure of magnetic switch 67 is operative to connect operating coil 92, of mercury relay 91, in circuit with the source of suitable potential. Energization of relay coil 92 results in closure of relay contacts 93, in a manner described hereinabove. Thus, potential to outlet 96 and thereby energization of motor 18, which is operatively connected thereto, is accomplished.

Energization of motor 18 is operative to result in rotational movement of circular blade 19 and reciprocal movement of carriage 20 along a predetermined path relative thereto. The automatic movement of the foodstuff across blade 19 results in an accumulation upon platter 15, to accordingly occasion an incremental response in the scale counter-balancing system. Capacity arm 34 is thereby moved in an upwardly directed vertically angular path in response to accumulations upon platter 15. Upon the desired amount of foodstuff being sliced, capacity arm 34 will reassume a balanced position such that air slot 65 is opposite magnet armature 71. When a rebalance occurs, mercury switch 67 will open to prevent further energizing current from flowing to coil 92 of relay 91 and thus permit normally opened contacts 93 to reassume their normally opened position. Opening of contacts 93 results in the removal of operating potential to slicer 12, and thereby results in cessation of the slicing operation.

It can thus be seen that my invention is capable of accurately determining when the desired amount of foodstuff has been parcelled out, and to prevent wastage or over-parcelling from occurring. It, of course, is clear that since no human acts of judgment are required, after the weight poise has been positioned to the desired quantity, that the operator is free to conduct other business without any fear of parcelling error resulting.

While it will be apparent that the embodiments of the invention herein disclosed is well calculated to fulfill the objects of the invention, it will be appreciated that the invention is susceptible to modification, variation and change without departing from the proper scope or fair meaning of the appended claims. For example, the mercury switch 67 may be replaced by a photo-sensitive device.

I claim:

1. For use with a food processing machine, an automatic weighing apparatus comprising, a scale platter removably mounted to a scale counter-balancing mechanism, said scale counter-balancing mechanism including a suitable zero set mechanism, said platter shaped to provide a subadjacent accumulating surface to the food processing machine, a scale arm operatively mounted to the counter-balancing mechanism of the scale, said scale arm being divided in weight graduations and having a vernier weight poise slidably mounted thereupon for graduation selection, said scale arm being in a balanced zero indicating position with said vernier weight poise positioned to a zero graduation and an empty scale platter, an electrical source of power, and scale arm sensing means having a fixed and movable portion and normally being in an "off" condition during scale arm balance conditions and assuming an "on" state during scale arm unbalanced conditions, said movable portion of said scale arm sensing means being fixedly mounted on said scale arm, said fixed portion of said scale arm sensing means being magnetically communicable with said movable portion of said scale arm sensing means and in circuit with said electrical source of power and the food processing machine such that said food processing machine is operative during scale arm unbalance due to differential positioning of said vernier weight poise relative to said counter-balancing mechanism to render said fixed portion of said scale arm sensing means into its "on" condition and permit electrical activating power to flow to said food processing machine, said fixed portion of said scale arm sensing means reassuming an "off" condition upon platter receipt of the appropriate amount of foodstuff from said food processing machinery to reestablish a scale arm balanced condition by way of the scale counter-balancing mechanism.

2. The combination as described in claim 1 wherein said scale arm sensing means includes a fixed portion comprising a magnetic switch having a mercury pool and one switch contact fixedly positioned therein, a second contact being normally biased in a non-conducting mercury position, said second contact having a magnet armature fixedly mounted thereupon, said mercury switch being in circuit between said source of electrical power and said food processing machine, movable portion comprising a magnet fixedly mounted upon said scale arm at a position opposite said counter-balancing mechanism for movement with said scale arm, said magnet in said movable portion of scale sensing means being in magnetic communication with said magnet armature in said fixed portion of said scale sensing means to close said second contact into a conducting mercury position to permit actuation of said food processing machine in scale arm unbalanced conditions, and thereby prevent actuation of said food processing machine in a scale arm balanced condition.

3. The combination defined by claim 2 including a mercury relay in circuit with said fixed portion of said scale sensing means and having a normally open relay contact and a contact closing coil, said normally open relay contact being in circuit with said source of potential and said food processing machine to prevent actuation thereof until closure of said relay contact, said contact closing coil being connected in series circuit arrangement with said mercury switch contact in said fixed portion of said scale sensing means and said source of operating potential such that upon magnetic closure of said mercury switch contacts, in response to the movement of said magnet mounted on said scale arm indicating the unbalanced condition of said scale arm whereby said contact closing coil will be energized to close said associated normally open relay contact and permit actuation of said food processing machinery, said operation persisting until a scale arm rebalancing is obtained by platter accumulation of the desired amount of foodstuff.

4. For use with a food slicing machine having an electrically operated motor for rotative movement of the slicing blade of the machine, and automatic weighing apparatus governing the operation of said motor comprising, a scale platter operatively mounted subadjacent to the rotatively mounted blade of said food slicer, a scale counter-balancing mechanism including a zero adjust mechanism, said platter operatively positioned upon said scale counter-balancing mechanism, said counter balancing mechanism being operative in response to accumulations upon said platter, a scale arm operatively connected at one of its end portions to said counter-balancing mechanism and assuming a balanced zero indicating position under empty platter conditions, adjustable means for upsetting the balance of said scale arm in accordance with the desired amount of foodstuff to be accumulated upon said platter, a permanent magnet mounted on an end portion of said scale arm opposite said counter-balancing mechanism, a source of electrical potential, a normally open non-conducting pair of relay contacts operatively connected between said source of operating potential and the motor of said slicing machine to accordingly prevent actuation of said motor, relay contact actuating means connected in circuit between said relay contacts and said source of potential, said relay contact actuating means being responsive to the position of permanent magnet on an end portion of said scale arm, such that upon said scale arm being in a balanced positioned said relay contact actuating means is in an "off" condition to prevent energization of the motor of said food processing machine, and upon said scale arm assuming an unbalanced state indicative of the amount of foodstuff desired to be accumulated on said platter, said relay contact actuating means is rendered into its "on" condition to permit closure of said normally open relay contacts permitting actuation of the motor of said food slicing machine, thereafter upon accumulation of the appropriate amount of foodstuff upon said platter said scale arm reassumes a balanced condition to render said relay contact actuating means into its "off" state and prevent further slicing of said foodstuff.

5. For use with a food slicing machine having an electric motor for operating its associated rotatively mounted cutting blade and a gravity food feeding arrangement capable of longitudinal movement of foodstuff relative to the cutting blade, an electric motor control means comprising, a scale counter balancing arrangement including a suitable zero adjust mechanism having a locking device associated therewith and scale tare system, a platter mounted upon a portion of said counter-balancing arrangement, said platter being shaped to assume an operative food accumulating position subadjacent to the blade, said accumulations being sensed by said counter-balancing arrangement, said counter-balancing arrangement being in a balanced neutral position when no food has accumulated upon the platter, a scale arm operatively mounted at one end portion thereof to said scale counter-balancing arrangement for movement thereby and responsive to accumulations upon said platter, a vernier weight poise having a locking mechanism associated therewith, said weight poise being slidably and rotatably mounted upon said scale arm between the opposite ends thereof, the position of said weight poise indicative of the desired amount of foodstuff to be accumulated upon said platter, a source of electrical potential, a mercury switch means having normally non-conducting electrical contacts in circuit with said source of electrical potential and said motor to prevent energization thereof, said mercury switch having a magnetic response armature operatively mounted to one contact thereof, a permanent magnet fixed mounted upon the other end portion of said scale arm, such that in a balanced condition said scale arm mounted magnet is inoperative to close said normally opened switch contacts and accordingly prevent actuation of said food slicing machinery, and upon said scale arm being unbalanced in response to selective positioning of said vernier weight poise, said magnet mounted upon said scale arm being operative to magnetically operate upon said magnetic armature mounted upon said contact of said mercury switch to result in closure thereof, electrical power thus being supplied to the motor of said food processing machine to result in accumulation of foodstuff upon the platter, said operation continuing until said scale arm and said magnet thereupon assume a balanced condition in response to said accumulation of said foodstuff to deactivate said mercury switch and prevent further activating power from being supplied to said electric motor.

6. The combination of claim 5 including a mercury relay having normally open relay contacts and a relay contact operating coil, said normally open relay contacts being connected in circuit with the electric motor current supply to render said electric motor inoperative until closure thereof, said relay contact operating coil connected in circuit with the electrical source of potential by way of said mercury switch, such that upon closure of said mercury switch said relay contact operating coil is energized to permit closure of its associated normally open relay contacts and permit operation of said electric motor.

References Cited by the Examiner

UNITED STATES PATENTS

| | | | |
|---|---|---|---|
| 1,287,896 | 12/1918 | Crane. | |
| 2,124,811 | 7/1938 | Bennett | 177—77 X |
| 2,597,831 | 5/1952 | Willis. | |
| 2,691,997 | 10/1954 | Matarrese | 146—102 |
| 3,198,272 | 8/1965 | Allen et al. | 177—60 |

FOREIGN PATENTS

| | | |
|---|---|---|
| 524,146 | 11/1953 | Belgium. |
| 302,970 | 12/1928 | Great Britain. |
| 583,991 | 1/1947 | Great Britain. |
| 338,226 | 3/1936 | Italy. |

RICHARD B. WILKINSON, *Primary Examiner.*

LEO SMILOW, *Examiner.*

ROBERT S. WARD, *Assistant Examiner.*